United States Patent
Hucker et al.

[11] 4,164,661
[45] Aug. 14, 1979

[54] LOAD SHARING SYSTEM

[75] Inventors: David J. Hucker, Rockford, Ill.; Richard W. Reynolds, Ames, Iowa

[73] Assignee: Sundstrand Corporation, Rockford, Ill.

[21] Appl. No.: 868,402

[22] Filed: Jan. 9, 1978

[51] Int. Cl.$^2$ .................... H02J 3/46; H02J 3/04; H02J 1/10
[52] U.S. Cl. .................................. 307/57; 307/84
[58] Field of Search .............. 307/57, 84; 290/40 B, 290/4; 222/63; 417/5, 6

[56] References Cited
U.S. PATENT DOCUMENTS

| | | | |
|---|---|---|---|
| 2,782,322 | 2/1957 | Hysler | 307/57 |
| 2,802,952 | 8/1957 | Fairweather | 307/57 |
| 2,985,765 | 5/1961 | Squires | 307/57 |
| 3,067,334 | 12/1962 | Byloff | 290/4 |
| 3,511,579 | 5/1970 | Gray | 417/6 |
| 3,719,809 | 3/1973 | Fink | 307/57 |
| 3,902,076 | 8/1975 | Meyers | 307/57 |

Primary Examiner—L. T. Hix
Assistant Examiner—S. D. Schreyer
Attorney, Agent, or Firm—Wegner, Stellman, McCord, Wiles & Wood

[57] ABSTRACT

Control systems for controlling load division among plural power sources coupled in parallel and providing power to a common load using feedback techniques. Control systems for various types of plural power sources are disclosed, including DC generators, hydraulic variable displacement pumps and AC generators driven by a constant speed drive. The outputs of the individual power sources are responsive and proportional to individual input control signals. The magnitude of a power component common to all the power sources or frequency, if the power sources are AC generators driven by constant speed drives, is compared to a reference to provide an error signal. Individual sensors sense the magnitude of a variable power component from each power source and provide a signal proportional thereto. Individual signals representing the variable power component are combined with the error signal to provide the individual control signals for each power source.

10 Claims, 4 Drawing Figures

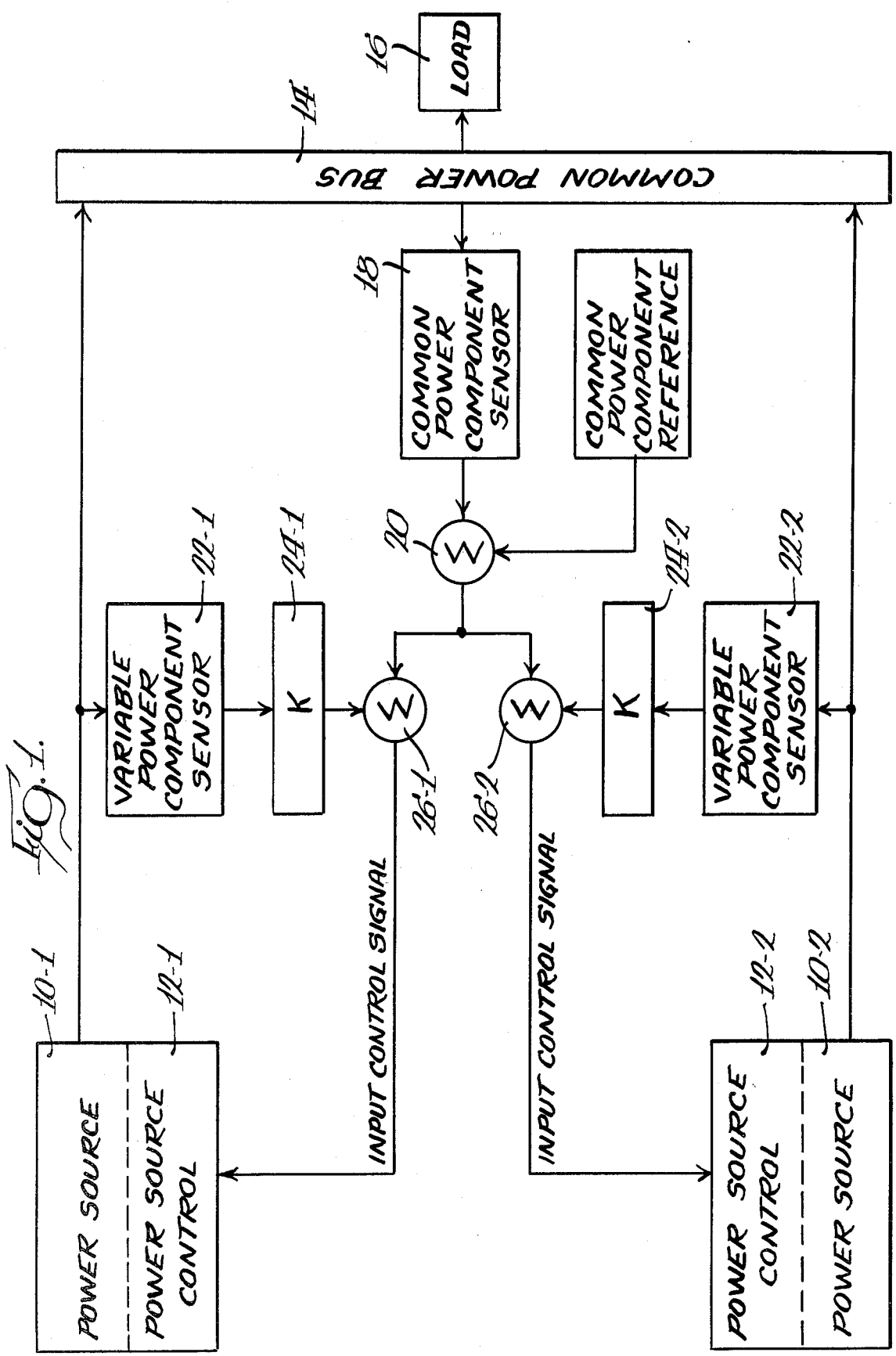

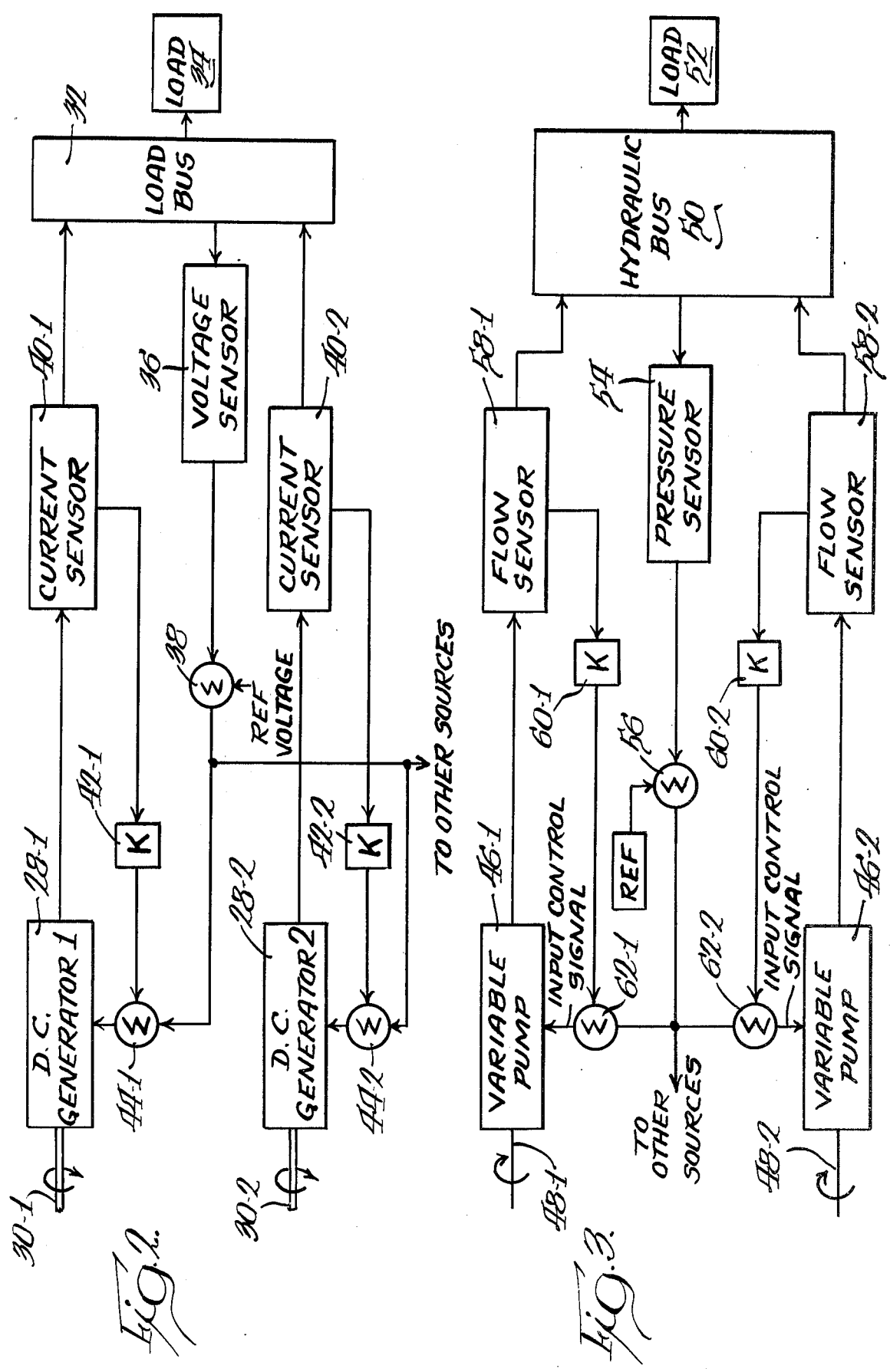

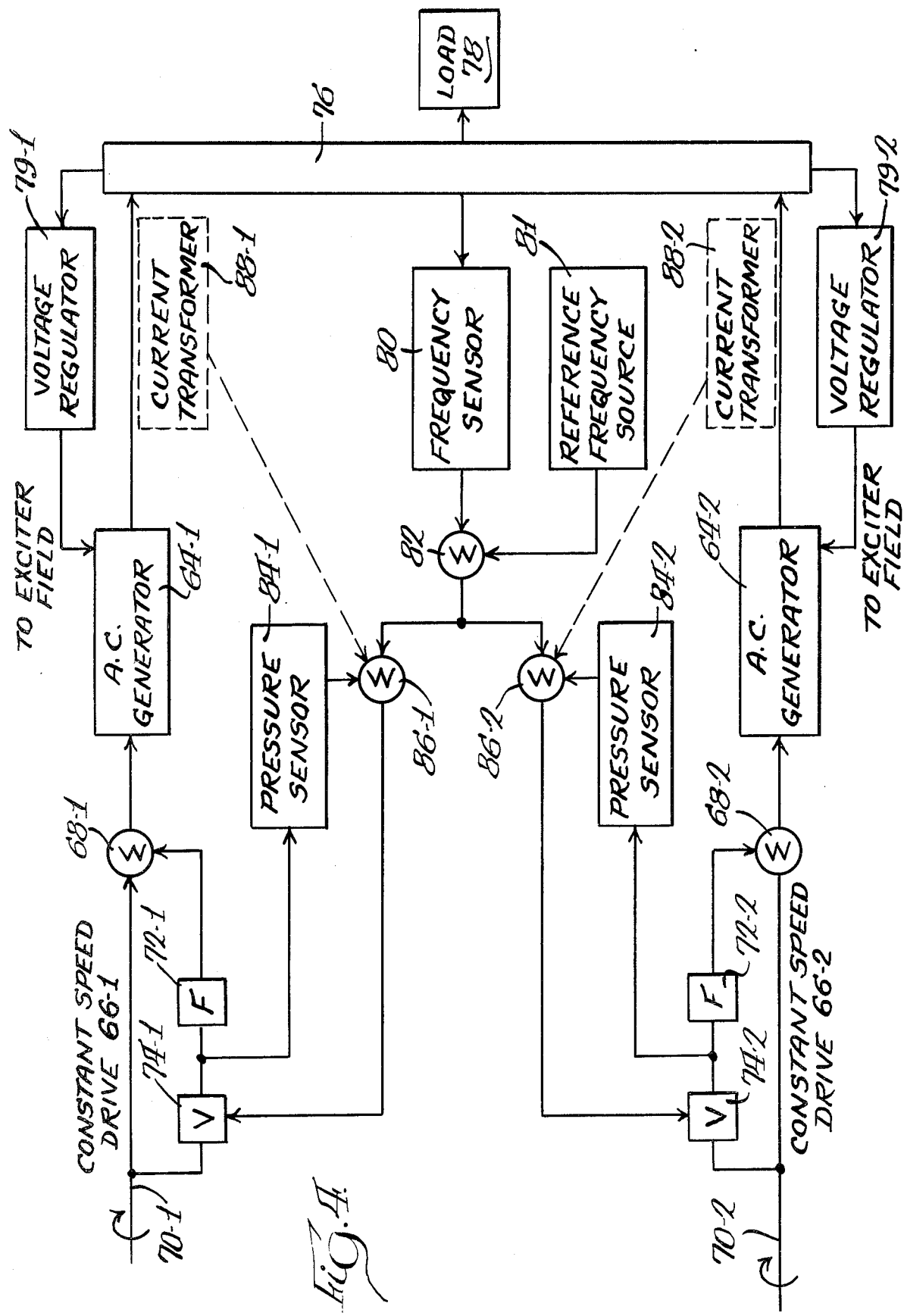

LOAD SHARING SYSTEM

BACKGROUND OF THE INVENTION

This invention relates to control system for controlling similar power sources coupled in parallel to form a power system and, more particularly, to control systems for assuring that power provided to a load is properly shared between the sources.

Plural power sources are often coupled in parallel to form a system which provides power to a common load. The power sources may be of many forms including electrical, mechanical or hydraulic. A variety of different control systems have been used to assure that the power provided to the load is properly shared and the specific control system depends upon the form of the power sources.

"Droop-type" systems have been employed to control the plural sources to assure that power provided to a load is properly shared between the sources. However, the use of this type of control system undesirably reduces the accuracy of the power sources during steady state operation.

Also, control systems reponsive to an unbalanced load condition have been widely used. These systems require that a load error signal for each source be provided. This requires that the control system interconnect to each power source. The use of interconnection conductors in the circuit is undesirable, particularly if the power sources are widely spaced.

SUMMARY OF THE INVENTION

According to the present invention, individual parallel-connected power sources form a power system, and a control system assures that the power provided to a common load is properly shared between the sources by the use of feedback techniques. The individual sources are responsive to an error signal representing the difference between a component of power common to the sources or frequency, if the power sources are AC generators, and a reference and to individual signals representing a variable power component. The individual input control signal for each power source is obtained by summing the error signal with the individual signal representing the variable component.

It is a feature of the present invention to provide a control system for various power sources, including DC sources, and hydraulic pumps, and AC generators using feedback techniques.

Another feature of the invention is to provide a control system for plural sources without the use of interconnecting conductors between each source.

Yet another feature of the invention is to provide a control system having individual feedback loops for individually controlling the power source in the loop.

DRAWING

FIG. 1 is a block diagram of a control system in accordance with the present invention;

FIG. 2 is a block diagram of a control system for plural DC generators;

FIG. 3 is a block diagram of a control system for plural hydraulic variable displacement pumps; and FIG. 4 is a block diagram of a control system for plural AC generators, each driven by a constant speed drive.

DESCRIPTION OF THE PREFERRED EMBODIMENT

FIG. 1 depicts a circuit for controlling load division between plural sources coupled in parallel by feedback techniques. Although only two power sources are shown, it will be apparent that the control circuit is capable of controlling load division among any number of plural sources. The plural sources to be controlled by the control system include, but need not be limited to, electrical, hydraulic and mechanical power sources. A requirement of any power source to be controlled by the present invention is that the output power from each power source be responsive and proportional to an input control signal.

Power sources 10-1 and 10-2 provide output power, the magnitude of each source being proportional to the individual input control signal applied to power source control 12-1 and 12-2, respectively. The power source control 12 causes the output power to vary directly with the magnitude of the input control signal applied to it.

The output from each power source 12 may be expressed as the product of two power components. In plural sources coupled in parallel to form a power system, one power component is common to all sources and the other power component varies, depending upon the power requirement of the load. Output power from power sources 10-1 and 10-2 is applied to common bus 14 which supplies power to load 16. The common power component is sensed by common power component sensor 18. The sensor 18 is selected to provide a signal proportional to the power component and the selection of a particular sensor depends upon the character of the power component (i.e., electrical, mechanical or hydraulic). The output of sensor 18 is applied to summer 20 where it is compared with a signal representing a selected reference value for the common power component. During steady state conditions, when the magnitude of the common power component is equal to the reference component, the output from summer 20 is zero (or a selected constant). However, if the common power component differs from the selected reference value, an error voltage from summer 20 having a magnitude and sign representing the difference between the selected reference value and the magnitude of the common component affects the output power for each power source, as will be explained in greater detail below.

The other of the two components of power is a variable power component. This component is sensed for power sources 10-1 and 10-2 by variable power component sensors 22-1 and 22-2, respectively. The signals representing the variable power components for each of the power sources are applied through amplifiers 24-1 and 24-2 to summers 26-1 and 26-2. The gains of amplifiers 24-1 and 24-2 may be individually selected and determine the amount of load division between the power sources 10-1 and 10-2. As will become apparent, if the gain K of amplifier 24-1 equals the gain K of amplifier 24-2, and power sources 10-1 and 10-2 have similar characteristics, the power to load 16 will be equally shared therebetween.

The outputs of summers 26-1 and 26-2 are the input control signals which control the output power from power sources 10-1 and 10-2, respectively. Each individual input control signal is therefore responsive to its own variable power component and to the difference between the common power component and the selected reference value as represented by the error signal from summer 20.

Referring to FIG. 2, a control system for DC generators as power sources is shown. The similar generators 28-1 and 28-2 are provided with rotational inputs, as represented by shafts 30-1 and 30-2 from turbines (not shown). The turbines provide energy to DC generators 28-1 and 28-2 at a constant speed. The magnitude of the power from the outputs of generators 28-1 and 28-2 is proportional to individual input control signals. For example, the input control signals may control the magnitude of the field current of the generator, thereby controlling the output power therefrom. The outputs from DC generator 28 are coupled to common bus 32 which provides power to load 34.

The output power from DC generators 28 may be expressed as the product of the current component and the voltage component. The common power component is the voltage and the variable power component is the current. Thus, the parallel-connected generators 28-1 and 28-2 are each capable of providing a variable current at a common voltage to load 34. The magnitude of the current provided by each generator varies in accordance with the current requirement established by the load.

The voltage is sensed by voltage sensor 36 at bus 32. The output of sensor 36 is applied to summer 38 where it is compared with a signal representing a selected common reference voltage. During steady state conditions, when the common voltage, as sensed by voltage sensor 36, equals the selected reference voltage applied to summer 38, the output therefrom is zero (or a selected constant). However, if an increase or decrease in a load requirement causes the voltage to change, the signal from sensor 36 differs from that of the reference, and an error voltage from summer 38 is provided. The error voltage represents the magnitude and sign of the difference between the actual and the selected reference value of the common power component of power. The error voltage from summer 38 affects each generator in the system in an identical manner.

The current from DC generators 28-1 and 28-2 is sensed by current sensors 40-1 and 40-2, respectively. The signals from sensors 40 represent the magnitude of the variable component of power being supplied by each generator. The outputs from the current sensors 40-1 and 40-2 are applied to amplifiers 42-1 and 42-2, respectively. The gains of amplifiers 42-1 and 42-2 may be individually selected to apportion the load between generators 28-1 and 28-2 in any selected manner. If the gains K of amplifiers 42 are equal and the DC generators are similar, the power provided by each generator will be equal. The output from amplifier 42-1 is combined with the area voltage from summer 38 at summer 44-1. The output from summer 44-1 is the input control signal which controls the field current of generator 28-1. Similarly, the output of amplifier 42-2 is combined with the error voltage from summer 38 at summer 44-2. The output from summer 44-2 is the input control signal which controls the field current of generator 28-2.

Referring to FIG. 3, a control system for parallel variable displacement hydraulic pumps is shown. The similar pumps 46-1 and 46-2 are provided with rotational input as represented by shafts 48-1 and 48-2, respectively. The magnitude of the hydraulic power from the inputs of pumps 46-1 and 46-2 is proportional to the individual input control signals. For example, the input control signals may control the energy imparted from shafts 48-1 and 48-2 to the pumps 46-1 and 46-2, thereby controlling the hydraulic power therefrom. The outputs from variable pumps 46 are coupled to a common hydraulic bus 50 which provides power to the hydraulic load 52. The output power from variable pumps 46 may be expressed as the product of the fluid flow rate and the fluid pressure. The common power component is the fluid pressure and the variable power component is the fluid flow rate. The parallel-coupled displacement pumps 46 provide a variable fluid flow at a common pressure to load 52. The magnitude of the fluid flow provided by each variable pump varies in accordance with the power requirement established by load 52, as will be discussed below.

The common pressure is sensed by pressure sensor 54. The output of sensor 54 is applied to summer 56 where it is compared to a signal representing a selected common reference pressure. During steady state conditions, when the common pressure, as sensed by pressure sensor 54, equals the selected reference pressure applied to summer 56, the output therefrom is zero or a selected constant. However, if as a result of an increase or decrease in a hydraulic load requirement, the pressure from sensor 54 differs from the reference pressure, an error voltage from summer 56 is provided. The error voltage represents the magnitude and sign of the difference between the actual and the required common component of power. The error signal from summer 56 affects each variable hydraulic pump in a substantially identical manner.

The flow rate from variable pumps 46-1 and 46-2 is sensed by flow sensors 58-1 and 58-2, respectively. The signals from sensors 58 represent the magnitude of the variable component of power (i.e., the flow rate) being supplied by each variable pump. The outputs from flow sensors 58-1 and 58-2 are applied to hydraulic amplifiers 60-1 and 60-2. The gains K of amplifiers 60-1 and 60-2 may be individually selected to apportion the flow rate between the variable pumps 46 in any selected manner. If the gains K of amplifiers 60 are equal and the variable pumps 46 are similar, the power provided by each pump will be equal. The output from amplifier 60-1 is combined with the error voltage from summer 56 at summer 62-1. The output from summer 62-1 is the input control signal which controls the amount of forces imparted from shaft 48-1 to variable pump 46-1. Similarly, the output of amplifier 60-2 is combined with the error voltage from summer 56 at summer 62-2. The output from summer 62-2 is the input control signal which controls the amount of energy from shaft 48-2 applied to the variable pump 46-2.

Referring to FIG. 4, a control system for AC generators 64, each coupled to a constant speed drive 66, is shown. An integrated constant speed drive generating system is particularly well suited for use with the present invention and is disclosed in detail in Baits U.S. Pat. No. 3,576,143.

Constant speed drives 66-1 and 66-2 provide rotational energy at a constant speed and a variable torque to the AC generators 64-1 and 64-2, respectively. The output power from the constant speed drives 66 and, hence, the AC generators 64, varies directly with the magnitude of the input control signal as applied to the constant speed drive.

Briefly, constant speed drive 66 includes a geared differential speed summer 68 which receives rotational energy directly from shaft 70. The rotational energy from shaft 70 is supplemented by rotational energy from fixed displacement hydraulic unit 72 which applies energy to the geared differential speed summer 68 in an amount proportional to the hydraulic pressure from variable displacement hydraulic unit 74. The pressure provided by variable displacement hydraulic unit 74 is proportional to an individual input control signal.

AC generators 64 supply a voltage at a selected magnitude (e.g., 110 volts) and frequency (e.g., 400 Hz) to synch bus 76, which provides common load 78. When the load 78 increases, the frequency of the common voltage drops. However, the magnitude of the common voltage for generators 64-1 and 64-2 is kept at the selected level by voltage regulators 79-1 and 79-2, respectively. The voltage regulators 79 and their operation are well known. The output from the voltage regulator is applied to the exciter field of the generators to keep the generator voltage at the selected level. Similarly, if the load 78 is decreased, the frequency of the common voltage increases, but the magnitude of the common voltage is kept at the selected level.

The output power from each generator 64 may be expressed as the product of two power components. The common power component is the voltage at the specified frequency and the variable power component is the current. The parallel-connected generators 64-1 and 64-2 are each capable of providing a variable amount of current at a common voltage to load 78.

The frequency of the common voltage is sensed by frequency sensor 80. The output of sensor 80 is applied to summer 82 where it is compared to a signal representing a selected common reference frequency from reference frequency source 81. During steady state conditions when the frequency of the common voltage, as sensed by frequency sensor 80, equals the selected frequency applied to summer 82, the output therefrom is zero (or a selected constant). However, if, as a result of an increase or decrease in the load requirement of load 78, the frequency of the voltage from frequency sensor 80 differs from the reference frequency, an error voltage from summer 82 is provided. The error voltage represents the magnitude and sign of the difference between the actual and the required common power component. The error signal from summer 82 affects the constant speed drive 66 of each channel in an identical manner.

The working pressure of hydraulic units 72 and 74 is proportional to the output torque from geared differential speed summer 68. Since the output speed from the geared differential speed summer 70 is constant, the working pressure is proportional to the output power. The output power from each generator can therefore be controlled by controlling the working pressure developed by the variable displacement hydraulic unit 74. The working pressure is detected by pressure sensor 84. The signal from sensor 84 represents the magnitude of the variable component of power being supplied by each generator. The output from sensor 84 is applied to summer 86 where it is combined with an error voltage from summer 82. The output from summer 86 is the input control signal which increases or decreases the working pressure of the variable displacement hydraulic unit in response to the input signal.

Alternatively, a signal proportional to the variable component of power from each generator 64 may be acquired by sensing the real power delivered by each generator, as by current transformers 88 which sense the current which is proportional to the power. The output from current transformers 88-1 and 88-2 is proportional to the variable power component from AC generators 64-1 and 64-2, respectively, and may provide an input signal to summer 86 in lieu of the signal from pressure sensor 84.

We claim:

1. A system for controlling load division among plural power sources coupled in parallel, comprising:
   at least two power sources each providing output power having two power components wherein the output power from each source is responsive and proportional to an individual input control signal;
   means connecting the outputs of each power source together, with one of said two components common;
   means for sensing the magnitude of the power component common to the power sources;
   a source of reference for said common power component;
   means for comparing said reference with the common power component to provide a common error signal;
   means for sensing the magnitude of the other of the two power components for each of the power sources to provide signals representative thereof;
   means for summing the signal representative of the magnitude of the other component for each of the power sources with said common error signal to provide an individual input control signal for each power source; and
   means for each power source responsive to the individual input control signal therefor to control the output power from each said power source.

2. The system of claim 1 wherein said power sources are DC generators and the two power components are current and voltage; said power component common to the power sources being the voltage, and the other of the two power components being the current.

3. The system of claim 1 wherein said power sources are hydraulic variable displacement pumps, and the two power components are hydraulic fluid pressure and hydraulic fluid flow rate; said power component common to the power sources being said fluid pressure and the other of the two components being the fluid flow rate.

4. A system for controlling load division among plural power sources coupled in parallel comprising:
   at least two power sources each providing output power having two power components wherein the output power from each source is responsive and proportional to an individual input control signal;
   means connecting the outputs of each power source together, with one of said two components common;
   means for sensing the magnitude of the power component common to the power sources;
   a source of reference for said common power component;
   means for comparing said reference with the common power component to the power sources to provide a common error signal; and
   an individual feedback loop for each power source providing an individual input control signal to the power source in that loop having
      means for sensing the magnitude of the other of the two power components from the power source and providing a signal proportional to the power component magnitude;

means for amplifying said power component magnitude signal by a gain to provide an amplified signal;

means for summing the amplified signal with the common error signal to provide said individual input control signal for the power source in that loop; and means responsive to said individual input control signal to control the output power from the power souce in said loop.

5. The control circuit of claim 4 wherein the selected gain of the means for amplifying said signal causes the magnitude of the individual input control signals to be equal.

6. A system for controlling load division among plural AC generators coupled in parallel, comprising:

a constant speed drive for each generator, each drive having an output shaft for providing rotational energy at a constant speed and at a torque proportional to an input control signal;

an AC generator coupled to the output shaft of each constant speed drive, wherein the output power from each AC generator is responsive to an input control signal to its constant speed drive;

means connecting the outputs of each AC generator together with a voltage common to the generators;

means for sensing the frequency of the common voltage;

a source of reference for said frequency;

means for comparing the frequency of the common voltage with the reference to provide a common error signal;

means for providing a signal proportional to the power from each of the AC generators;

means for combining the signal proportional to the power from each of the AC generators with said common error signal to provide individual input control signals; and means connecting each individual input control signal to the constant speed drive of the associated generator.

7. The circuit of claim 6 wherein the means for providing a signal proportional to the power for each of the AC generators includes a transformer for sensing the power from the AC generator.

8. The circuit of claim 7 wherein the transformer is a current transformer for sensing the current component of the power.

9. The circuit of claim 6 wherein the constant speed drive has a variable hydraulic displacement pump and the output power of the AC generator is proportional to the hydraulic fluid pressure in the variable displacement pump, and the means for providing a signal proportional to the power for each of the AC generators includes a pressure sensor for sensing the pressure of the hydraulic fluid.

10. A system for controlling load division among plural AC generators coupled in parallel, each generator being driven by a constant speed drive, comprising:

a constant speed drive for each generator, each drive having an output shaft for providing rotational energy at a constant speed and at a torque proportional to an input control signal;

an AC generator coupled to the output shaft of each constant speed drive wherein the output power from each AC generator is responsive to an input control signal to its constant speed drive;

means connecting the outputs of each AC generator together with a voltage common to the generators;

means for sensing the frequency of the common voltage;

a source of reference for said frequency;

means for comparing the frequency of the common voltage with the reference to provide a common error signal; and an individual feedback loop for each power source for providing an individual input control signal to the power source in that loop and having means for sensing the magnitude of the power from the AC generator and providing a signal proportional to the power magnitude;

means for amplifying said signal proportional to the magnitude of the power to provide an amplified signal;

means for summing the amplified signal with the common error signal to provide said individual input control signal for the power source in that loop; and means connecting the individual input control signal to the constant speed drive of the associated generator.

* * * * *